US008902972B2

(12) United States Patent
Karczewicz et al.

(10) Patent No.: US 8,902,972 B2
(45) Date of Patent: Dec. 2, 2014

(54) RATE-DISTORTION QUANTIZATION FOR CONTEXT-ADAPTIVE VARIABLE LENGTH CODING (CAVLC)

(75) Inventors: Marta Karczewicz, San Diego, CA (US); Peisong Chen, San Diego, CA (US); Yan Ye, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1038 days.

(21) Appl. No.: 12/338,838

(22) Filed: Dec. 18, 2008

(65) Prior Publication Data

US 2009/0257489 A1      Oct. 15, 2009

Related U.S. Application Data

(60) Provisional application No. 61/044,232, filed on Apr. 11, 2008.

(51) Int. Cl.
*H04N 7/26* (2006.01)
*H04N 19/126* (2014.01)
*H04N 19/124* (2014.01)

(52) U.S. Cl.
CPC ..... *H04N 19/00096* (2013.01); *H04N 19/0009* (2013.01)
USPC .................................................... 375/240.03

(58) Field of Classification Search
CPC ................................................ H04N 19/00175
USPC ........................................ 375/240.01, 240.03
IPC .......................................................... H04N 7/12
See application file for complete search history.

(56) References Cited

U.S. PATENT DOCUMENTS 6,249,546 B1   6/2001   Bist
6,445,739 B1   9/2002   Shen et al.
(Continued)

FOREIGN PATENT DOCUMENTS

CA     2709711 A1    7/2009
CN     1622635 A     6/2005
(Continued)

OTHER PUBLICATIONS

Max Luttrell Jiangtao (Gene) Wen John Villasenor Ucla et al: "Simulation Results for Adaptive Quantization Using Trellis Based R-D Information" Joint Video Team (JVT) of ISO/IEC MPEG & ITU-T VCEG(ISO/IEC JTC1/SC29/WG11 and ITU-T SG16 Q6), XX, XX, No. q15e.

(Continued)

*Primary Examiner* — Jay Patel
*Assistant Examiner* — Yulin Sun
(74) *Attorney, Agent, or Firm* — Brent A. Boyd

(57) ABSTRACT

In general, this disclosure provides techniques for quantization of the coefficients of video blocks in a manner that can achieve a desirable balance of rate and distortion. The described techniques may analyze a plurality of quantization levels associated with each individual coefficient to select the quantization level for the individual coefficients that results in a lowest coding cost. Since CAVLC does not encode each coefficient independently, the techniques may compute the coding costs for each of the candidate quantization levels associated with the individual coefficients based on quantization levels selected for previously quantized coefficients and estimated (or predicted) quantization levels for subsequent coefficients of a coefficient vector. The quantization levels for each of the coefficients are selected based on computed coding costs to obtain a set of quantized coefficients that minimize a rate-distortion model.

38 Claims, 7 Drawing Sheets

(56) References Cited

U.S. PATENT DOCUMENTS

| | | | |
|---|---|---|---|
| 6,535,647 | B1 | 3/2003 | Abousleman |
| 6,697,434 | B1 | 2/2004 | Kim |
| 6,795,584 | B2 | 9/2004 | Karczewicz et al. |
| 2006/0013493 | A1* | 1/2006 | Yang et al. .................. 382/232 |
| 2007/0024475 | A1 | 2/2007 | Kadono et al. |
| 2007/0041449 | A1 | 2/2007 | Bjontegaard et al. |
| 2007/0217506 | A1* | 9/2007 | Yang et al. ............. 375/240.03 |
| 2008/0001796 | A1 | 1/2008 | Oshikiri et al. |
| 2008/0279466 | A1* | 11/2008 | Yang ............................ 382/246 |

FOREIGN PATENT DOCUMENTS

| | | | |
|---|---|---|---|
| JP | 2001313946 | A | 11/2001 |
| JP | 2001525639 | A | 12/2001 |
| JP | 2008011204 | A | 1/2008 |
| KR | 20070069381 | A | 7/2007 |
| RU | 2004125588 | A | 1/2006 |
| RU | 2005113308 | A | 1/2006 |
| WO | 9929115 | A1 | 6/1999 |
| WO | 03063501 | A1 | 7/2003 |
| WO | 2007038248 | A2 | 4/2007 |
| WO | WO2007079964 | A1 | 7/2007 |
| WO | 2007133404 | A2 | 11/2007 |

OTHER PUBLICATIONS

Villasenor Ucla et al: "Simulation Results on Trellis-Based Adaptive Quantization" Joint Video Team (JVT) of ISO/IEC MPEG & IT ITU-T VCEG(ISO/IEC JTC1/SC29/WG11 and ITU-T SG16 Q6), XX, XX, No. q15d40, Apr. 20, 1998, XP030002785.

International Search Report—PCT/US09/040258, International Search Authority—European Patent Office—Jun. 17, 2009.

Written Opinion—PCT/US09/040258, International Search Authority—European Patent Office—Jun. 17, 2009.

En-hui Yang et al., "Rate Distortion Optimization of H.264 with Main Profile Compatibilty," IEEE 2006, pp. 282-286.

En-hui Yang et al., "Rate Distortion Optimization of H.264 Interframe Coding: A General Framework and Algorithms," IEEE 2007, pp. 1774-1784.

Kondi L.P. "A Rate-Distortion Optimal Hybrid Scalable/Multiple-description Video Codec", IEEE International Conference on Acoustics, Speech and Signal Processing, 2004, Proceedings (ICASSP'04) May 17-21, 2004, vol. 3.

Yanmei Qu et al., A Novel Cost-Effective and Programmable VLSI Architecture of CAVLC Decoder for H.264/AVC, Journal of Signal Processing Systems, vol. 50, No. 1, Jan. 2008.

Taiwan Search Report—TW098112073—TIPO—Jan. 22, 2013.

\* cited by examiner

US 8,902,972 B2

RATE-DISTORTION QUANTIZATION FOR CONTEXT-ADAPTIVE VARIABLE LENGTH CODING (CAVLC)

RELATED APPLICATIONS

This application claims the benefit of U.S. Provisional Application No. 61/044,232 filed on Apr. 11, 2008, the entire contents of which is incorporated herein by reference.

TECHNICAL FIELD

This disclosure relates to digital video coding and, more particularly, quantization techniques for video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, video gaming devices, video game consoles, cellular or satellite radio telephones, and the like. Digital video devices implement video compression techniques, such as MPEG-2, MPEG-4, or ITU-T H.264/MPEG-4, Part 10, Advanced Video Coding (AVC), to transmit and receive digital video information more efficiently. Video compression techniques perform spatial prediction and temporal prediction to reduce or remove redundancy inherent in video sequences.

Intra-coding relies on spatial prediction to reduce or remove spatial redundancy between video blocks within a given coded unit, which may comprise a video frame, a slice of a video frame, a group of pictures, or another defined unit of video blocks. In contrast, inter-coding relies on temporal prediction to reduce or remove temporal redundancy between video blocks of successive coded units of a video sequence. For intra-coding, a video encoder performs spatial prediction to compress data based on other data within the same coded unit. For inter-coding, the video encoder performs motion estimation and motion compensation to track the movement of corresponding video blocks of two or more adjacent coded units.

A coded video block may be represented by prediction information that can be used to create or identify a predictive block, and a residual block of data indicative of differences between the block being coded and the predictive block. In the case of inter-coding, one or more motion vectors are used to identify the predictive block of data, while in the case of intra-coding, the prediction mode can be used to generate the predictive block. Both intra-coding and inter-coding may define several different prediction modes, which may define different block sizes and/or prediction techniques used in the coding. Additional types of syntax elements may also be included as part of encoded video data in order to control or define the coding techniques or parameters used in the coding process.

After block-based prediction coding, the video encoder may apply transform, quantization and entropy coding processes to further reduce the bit rate associated with communication of a residual block. Transform techniques may comprise discrete cosine transforms or conceptually similar processes. Alternatively, wavelet transforms, integer transforms, or other types of transforms may be used. In a discrete cosine transform (DCT) process, as an example, the transform process converts a set of pixel values into transform coefficients, which may represent the energy of the pixel values in the frequency domain. Quantization is applied to the transform coefficients, and generally involves a process that limits the number of bits associated with any given transform coefficient. Entropy coding comprises one or more processes that collectively compress a sequence of quantized transform coefficients.

Context-adaptive variable length coding (CAVLC) is one type of entropy coding technique that is currently supported in some coding standards, such as the International Telecommunication Union Standardization Sector (ITU-T) H.264/Motion Pictures Expert Group (MPEG)-4, Part 10 Advanced Video Coding (AVC) (hereinafter "H.264/MPEG-4 Part 10 AVC standard"). In accordance with CAVLC as defined in the H.264/MPEG-4, Part 10 AVC standard, an encoder encodes a plurality of syntax elements that represent a coefficient vector. The syntax elements may include a total number of coefficients in the coefficient vector, a number of trailing ones in the coefficient vector, signs of each of the trailing ones, magnitudes (or levels) of nonzero coefficients other than the trailing ones, sum of all runs (i.e., the total number of runs before the last nonzero coefficient), and a run length of zeros before each nonzero coefficient. CAVLC is adaptive in that the encoder adaptively selects the VLC coding tables to use in encoding the syntax elements based on particular characteristics of the coefficient vector.

SUMMARY

In general, this disclosure describes techniques for quantization of the coefficients of video blocks in a manner that can achieve a desirable balance of rate and distortion. The described techniques may analyze a plurality of quantization levels associated with each individual coefficient to select the quantization level for the individual coefficients that results in a lowest coding cost. Since CAVLC does not encode each coefficient independently, the techniques may compute the coding costs for each of the candidate quantization levels associated with the individual coefficients based on quantization levels selected for previously quantized coefficients and estimated (or predicted) quantization levels for subsequent coefficients of a coefficient vector. The quantization levels for each of the coefficients are selected based on computed coding costs to obtain a set of quantized coefficients that minimize a rate-distortion model.

In one example, this disclosure provides a method of quantizing at least a portion of coefficients of a video block in a video coding process. The method includes determining, for each of the portion of the coefficients of the video block, coding costs for a plurality of candidate quantization levels associated with the respective coefficient and selecting one of the plurality of the candidate quantization levels for each of the coefficients based on the coding costs to obtain a set of quantized coefficients.

In another example, this disclosure provides an apparatus for quantizing at least a portion of coefficients of a video block in a video coding process. The apparatus includes a quantization unit that determines, for each of the portion of the coefficients of the video block, coding costs for a plurality of candidate quantization levels associated with the respective coefficient and selects one of the plurality of the candidate quantization levels for each of the coefficients based on the coding costs to obtain a set of quantized coefficients.

In another example, a device for quantizing at least a portion of coefficients of a video block in a video coding process. The device comprises means for determining, for each of the portion of the coefficients of the video block, coding costs for a plurality of candidate quantization levels associated with the respective coefficient and means for selecting one of the plurality of the candidate quantization levels for each of the coefficients based on the coding costs to obtain a set of quantized coefficients.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable medium comprising instructions that upon execution cause a device to quantize at least a portion of coefficients of a video block in a video coding process. The instructions cause the device to determine, for each of the portion of the coefficients of the video block, coding costs for a plurality of candidate quantization levels associated with the respective coefficient and select one of the plurality of the candidate quantization levels for each of the coefficients based on the coding costs to obtain a set of quantized coefficients.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
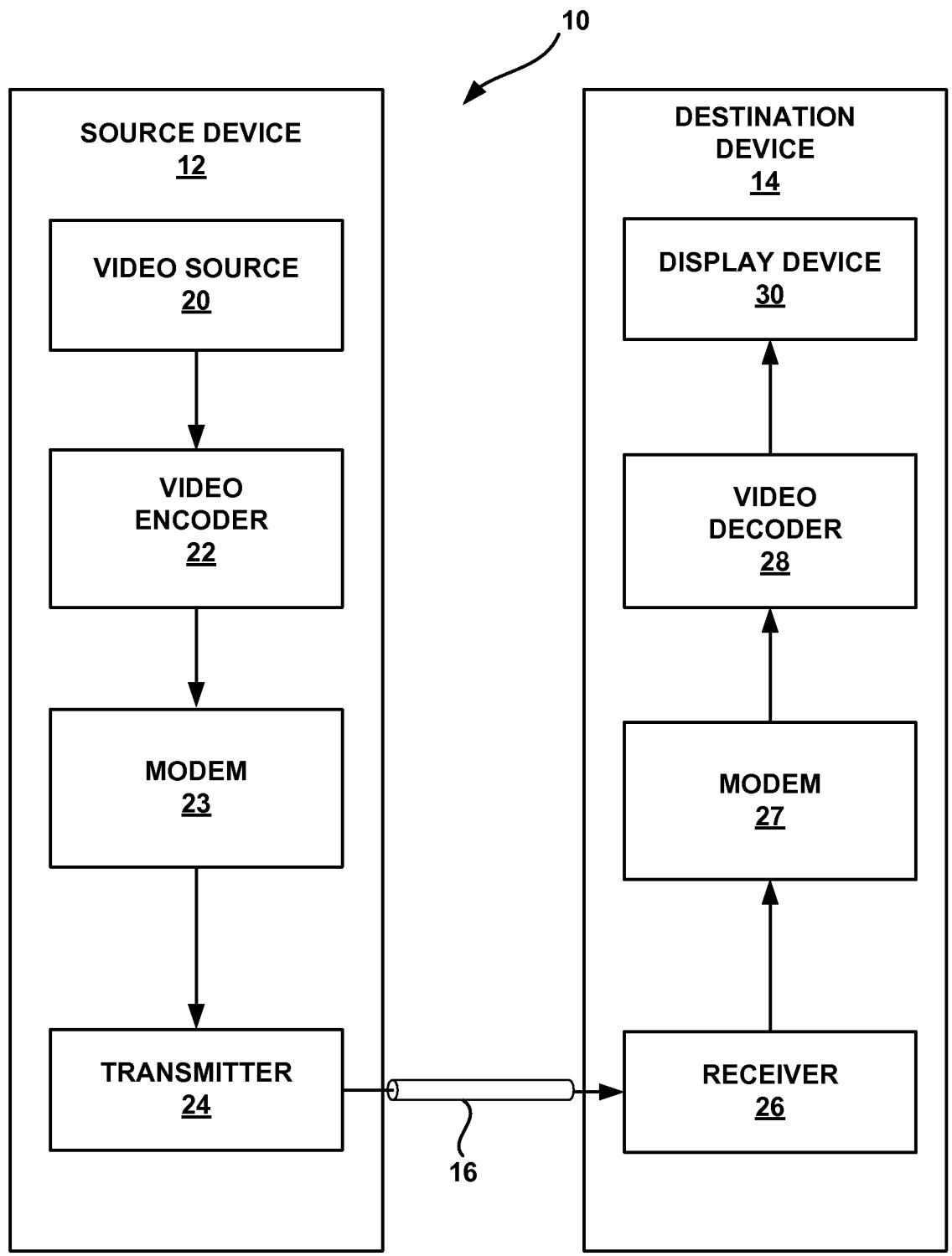
FIG. 1 is an exemplary block diagram illustrating a video encoding and decoding system that may implement one or more of the techniques of this disclosure.

FIG. 1 is a block diagram illustrating an example video encoding and decoding system 10 that may implement techniques of this disclosure. As shown in FIG. 1, system 10 includes a source device 12 that transmits encoded video to a destination device 14 via a communication channel 16. Source device 12 and destination device 14 may comprise any of a wide range of wired or wireless devices. In some cases, source device 12 and destination device 14 comprise wireless communication devices, such as wireless handsets, so-called cellular or satellite radiotelephones, or any wireless devices that can communicate video information over communication channel 16. Although described throughout this disclosure in the context of wireless applications or settings, the techniques of this disclosure should not be limited as such. The technique may also be utilized in wired applications or settings.

In the example of FIG. 1, source device 12 may include a video source 20, video encoder 22, a modulator/demodulator (modem) 23 and a transmitter 24. Destination device 14 may include a receiver 26, a modem 27, a video decoder 28 and a display device 30. In accordance with this disclosure, video encoder 22 of source device 12 may be configured to apply the quantization techniques described in this disclosure. In this way, source device 12 may achieve desirable levels of quantization and thereby improve the encoding process.

In general, source device 12 generates coded video data for transmission to destination device 14. In some cases, however, devices 12, 14 may operate in a substantially symmetrical manner. For example, each of devices 12, 14 may include video encoding and decoding components as well as transmit and receive components. Hence, system 10 may support one-way or two-way video transmission between devices 12, 14, e.g., for video streaming, video playback, video broadcasting, or video telephony.

Video source 20 of source device 12 may include a video capture device, such as a video camera, a video archive containing previously captured video, or a video feed from a video content provider, e.g., via satellite. As a further alternative, video source 20 may generate computer graphics-based data as the source video, or a combination of live video, archived video, and computer-generated video. In some cases, if video source 20 is a video camera, source device 12 and destination device 14 may form so-called camera phones or video phones. In each case, the captured, pre-captured or computer-generated video may be encoded by video encoder 22. The encoded video information may then be modulated by modem 23 according to a communication standard, e.g., such as code division multiple access (CDMA) or another communication standard, and transmitted to destination device 14 via transmitter 24. Modem 23 may include various mixers, filters, amplifiers or other components designed for signal modulation. Transmitter 24 may include circuits designed for transmitting data, including amplifiers, filters, and one or more antennas.

Receiver 26 of destination device 14 receives information over channel 16, and modem 27 demodulates the information. Video decoder 28 may decode the encoded video data to reconstruct the video sequence. Display device 30 displays the decoded video data to a user, and may comprise any of a variety of display devices such as a cathode ray tube, a liquid crystal display (LCD), a plasma display, an organic light emitting diode (OLED) display, or another type of display device.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14.

Video encoder 22 and video decoder 28 may operate according to a video compression standard, such as the H.264/MPEG-4 Part 10 AVC standard. The ITU-T H.264/MPEG-4 Part 10 AVC standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard.

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or any combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like.

A video sequence typically includes a series of video frames. Video encoder 22 operates on video blocks within individual video frames in order to encode the video data. The video blocks may have fixed or varying sizes, and may differ in size according to a specified coding standard. Each video frame may include a series of slices, which may be independently decodable units of the video frame. Each slice may include a series of macroblocks, which may be arranged into sub-blocks. As an example, the H.264 standard supports intra prediction in various block sizes, such as 16×16, 8×8, or 4×4 for luma components, and 8×8 for chroma components, as well as inter prediction in various block sizes, such as 16×16, 16×8, 8×16, 8×8, 8×4, 4×8 and 4×4 for luma components and corresponding scaled sizes for chroma components. Smaller video blocks can provide better resolution, and may be used for locations of a video frame that include high levels of detail. In general, macroblocks (MBs) and the various sub-blocks may be considered to be video blocks.

Video blocks may comprise blocks of pixel data, or blocks of transformation coefficients, e.g., following a transformation process such as discrete cosine transform (DCT) or other transformation process. The term "coefficients" as used in this disclosure generally refers to transform coefficients, but may alternatively refer to other types of coefficients or values, such as pixel values, or another type of coefficients. The quantization techniques of this disclosure typically apply to the transformation coefficients of transformed video blocks, sometimes referred to as residual transform coefficients.

To encode the video blocks, video encoder 22 performs intra- or inter-prediction to generate a prediction block. Video encoder 22 subtracts the prediction blocks from the original video blocks to be encoded to generate residual blocks. Thus, the residual blocks are indicative of differences between the blocks being coded and the prediction blocks. Video encoder 22 may perform a transform on the residual blocks to generate blocks of transform coefficients. Following intra- or inter-based predictive coding and transformation techniques, video encoder 22 performs quantization. Quantization is discussed in greater detail below, but generally refers to a process in which coefficients are quantized to possibly reduce the amount of data used to represent the coefficients. Following quantization, entropy coding may be performed according to an entropy coding methodology, such as CAVLC. More details of each step of the encoding process performed by video encoder 22 will be described in more detail below in FIG. 2.

This disclosure provides techniques for quantization of the coefficients of video blocks in a manner that can achieve a desirable balance of rate and distortion. In other words, the techniques improve the quantization step of the encoding process to achieve a desirable level of quality at a given bit budget for the communication rate. According to the techniques of this disclosure, video encoder 22 may, for at least a portion of the coefficients of the blocks, analyze a plurality of quantization levels to select the quantization level for the individual coefficients that has a lowest coding cost.

In one example, video encoder 22 may compute a coding cost, e.g., using a Lagrange cost function associated with a rate-distortion model, for each of the candidate quantization levels associated with the individual coefficients sequentially. Since CAVLC does not encode each coefficient independently, video encoder 22 may compute the coding costs for each of the candidate quantization levels associated with the individual coefficients based on quantization levels of all the other coefficients of the coefficient vector. The quantization levels of the current and preceding coefficients are known; the quantization level of the current coefficient is equal to one of the candidate quantization levels and the quantization levels of the preceding coefficients have been previously selected. The quantization levels of coefficients that are subsequent to the current coefficient are unknown and may therefore be estimated as described in detail below. Video encoder 22 selects the candidate quantization level with the lowest coding cost for the individual coefficient currently being analyzed. Video encoder 22 select quantization levels in the manner described above for all of the coefficients of the block. This approach is referred to as a one-pass or single-pass approach.

Alternatively, video encoder 22 may compute more than one coding cost (or a plurality of coding costs) for each of the candidate quantization levels associated with the individual coefficients. The plurality of coding costs may be computed based on surviving paths of previously selected quantization levels associated with previous coefficients as well estimates of future (subsequent) quantization levels for subsequent coefficients. As described if further detail below with respect to FIGS. 2 and 4, a surviving path represents a sequence of quantization decisions on previous coefficients in the block. Video encoder 22 continues to select quantization levels in the manner described above for all of the coefficients of the block until a single surviving path exists. The single surviving path represents a sequence of quantization decisions on all the coefficients in the block.

The quantization techniques of this disclosure may enable video encoder 22 to achieve a desirable level of quality at a given bit budget for a communication rate. In accordance with the techniques of this disclosure, video encoder 22 can implement a rate-distortion model on a coefficient by coefficient basis and achieve a desired level of quantization. In contrast, conventional quantization techniques implement the rate-distortion model on block by block basis as opposed to a coefficient by coefficient basis. In other words, conventional quantization techniques only analyze a single quantization level for each of the coefficients in computing a coding cost for the entire block. Such techniques may not be as effective as the techniques of this disclosure in selecting quantized coefficients or quantization levels such that a distortion metric is minimized subject to a maximum target coding-bit-rate constraint, or equivalently, the coding bit rate is minimized subject to a maximum allowable distortion constraint.

Figure 2:
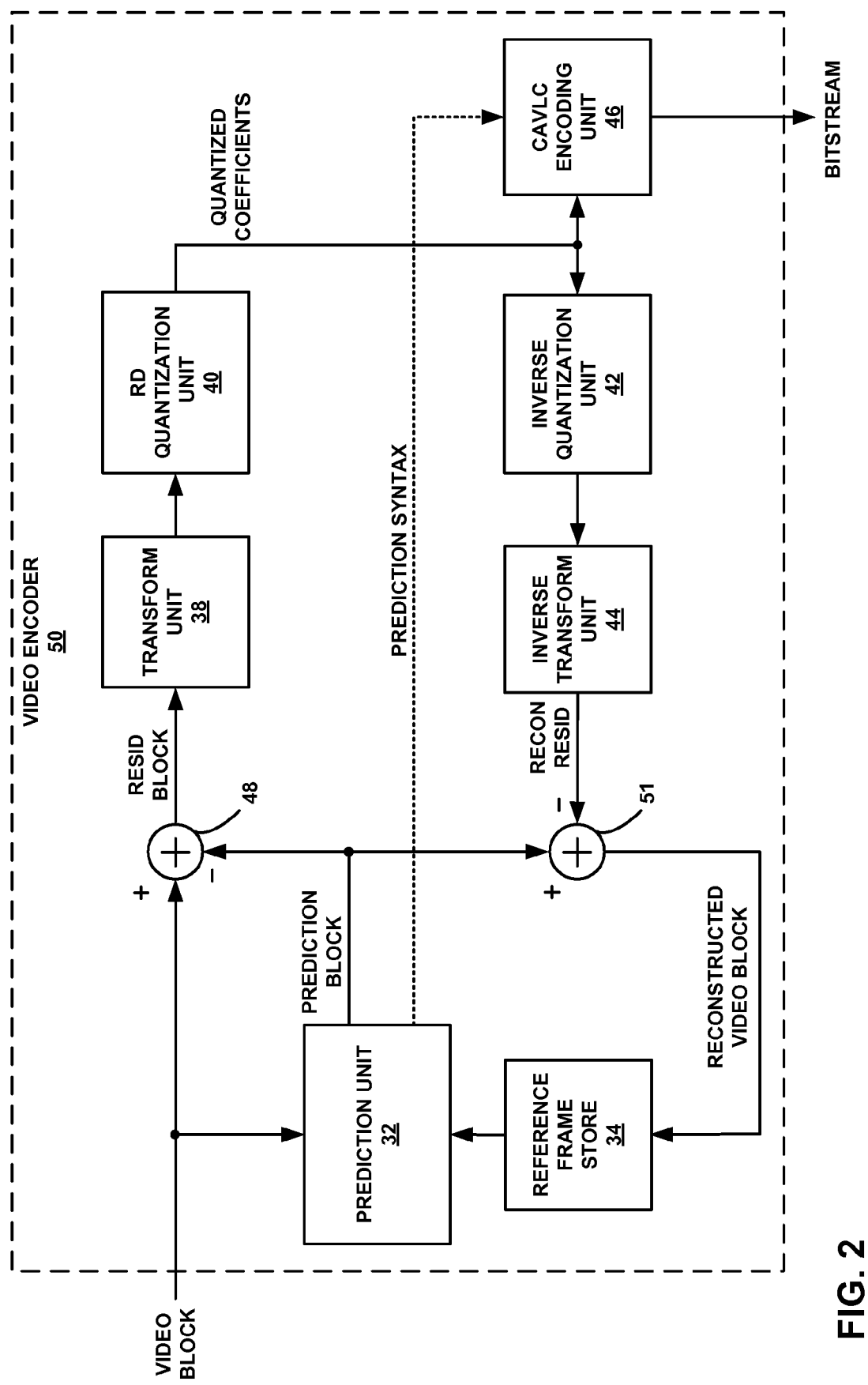
FIG. 2 is a block diagram illustrating an example of a video encoder consistent with this disclosure.

FIG. 2 is a block diagram illustrating an example of a video encoder 50 that includes a rate-distortion (RD) quantization unit 40 that performs quantization of coefficients of a video block consistent with this disclosure. Video encoder 50 may, for example, correspond to video encoder 22 of source device 12. Video encoder 50 may perform intra- and inter-coding of blocks within video frames. Intra-coding relies on spatial prediction to reduce or remove spatial redundancy in video within a given video frame. Inter-coding relies on temporal prediction to reduce or remove temporal redundancy in video within adjacent frames of a video sequence. For inter-coding, video encoder 50 may perform motion estimation to track the movement of matching video blocks between two or more adjacent frames. Intra-mode (I-mode) may refer to the spatial based compression mode and Inter-modes, such as prediction (P-mode) or bi-directional (B-mode), may refer to the temporal based compression modes.

In the example of FIG. 2, video encoder 50 includes a prediction unit 32, reference frame store 34, transform unit 38, RD quantization unit 40, inverse quantization unit 42, inverse transform unit 44 and CAVLC coding unit 46. A deblocking filter (not shown) may also be included to filter block boundaries to remove blockiness artifacts. Video encoder 50 also includes summer 48 and summer 51.

As shown in FIG. 2, video encoder 50 receives a current video block of a video frame or slice of a video frame to be encoded. Prediction unit 32 performs predictive coding techniques to generate a prediction block. Prediction unit 32 may represent an intra prediction unit and/or an inter prediction unit. For inter coding, prediction unit 32 compares the current video block to be encoded to various blocks in one or more reference video frames or slices in order to define the prediction block. For intra coding, prediction unit 32 generates the prediction block based on neighboring data within the same coded unit, e.g., video frame or slice.

For inter coding, prediction unit 32 may comprise motion estimation that identifies one or more motion vectors that each point to a block in a reference frame and a motion compensation unit that generates the prediction block based on the motion vectors. As such, motion estimation may be considered the process of generating the motion vector, which estimates motion. For example, the motion vector may indicate the displacement of a prediction block within a reference frame relative to the current block being coded within the current frame. The reference frame may be temporally located prior to or after the video frame or slice to which the current video block belongs. Motion compensation may be considered the process of fetching or generating the prediction block based on the motion vector determined by motion estimation.

As noted, for intra coding, prediction unit 32 generates the prediction block based on neighboring data within the same coded unit. One or more intra-prediction modes may define how an intra prediction block can be defined. In accordance with the H.264/MPEG-4 Part 10 AVC standard, for example, prediction unit 32 may generate a 4×4 or 8×8 prediction block using one of nine possible intra-prediction modes: a vertical prediction mode, horizontal prediction mode, DC prediction mode, diagonal down/left prediction mode, diagonal down/right prediction mode, vertical-right prediction mode, horizontal-down predication mode, vertical-left prediction mode and horizontal-up prediction mode. Alternatively, prediction unit 32 may generate a 16×16 prediction block using one of four possible intra-prediction modes defined in the H.264/MPEG-4 Part 10 AVC standard: a vertical prediction mode, a horizontal prediction mode, a DC prediction mode, and a plane prediction mode.

Video encoder 50 forms a residual video block (labeled "RESID BLOCK") by subtracting the prediction video block produced by prediction unit 32 from the original video block to be encoded. Summer 48 performs this subtraction operation to obtain the residual block. Transform unit 38 applies a transform, such as a discrete cosine transform (DCT), to the residual block to produce a video block of residual transform coefficients. Transform unit 38 may apply the transform on 8×8 (N=8) or 4×4 (N=4) block basis. Transform unit 38 may, however, perform other transforms defined by the H.264 standard, which are conceptually similar to the DCT. Wavelet transforms, integer transforms, sub-band transforms or other types of transforms could also be used. In any case, transform unit 38 applies the transform to the residual block, producing a block of residual transform coefficients. The transform may convert the residual information from a pixel domain to a frequency domain.

RD quantization unit 40 (also referred to herein as "quantization unit 40") quantizes the residual transform coefficients to further reduce bit rate. In particular, quantization unit 40 performs one or more of the quantization techniques described in greater detail below in an effort to achieve a desirable level of quality at a given bit budget for the communication rate. In this way, quantization unit 40 can implement a rate-distortion model and achieve a desired level of quantization that, e.g., achieves a desirable number of bits for a given rate or bit budget.

Quantized transform coefficients, together with prediction syntax (e.g., motion vectors, prediction modes, or other control information), may form a complete coded sequence of elements. CAVLC encoding unit 46 entropy codes the quantized transform coefficients and the prediction syntax so as to further reduce the number of bits needed for their representation. Following the entropy coding by CAVLC encoding unit 46, the encoded video may be transmitted to another device or archived for later transmission or retrieval.

The quantized coefficients are also provided to inverse quantization unit 42. Inverse quantization unit 42 and inverse transform unit 44 apply inverse quantization and inverse transformation, respectively, to reconstruct the residual block (labeled "RECON RESID") in the pixel domain for use as a reference block. Summer 51 adds the reconstructed residual block output by inverse transform unit 44 to the prediction block produced by prediction unit 32 to produce a reconstructed video block for storage in reference frame store 34. The reconstructed video block stored in reference frame store 34 may be used by prediction unit 32 as a reference block to inter-code a block in a subsequent video frame or intra-code a block in the same frame.

A prediction error or residual block E(x, y), i.e., the difference between the block to be encoded I(x, y) and the prediction block P(x, y), may be represented as a weighted sum of transform basis functions $f_{ij}(x, y)$:

$$E(x, y) = \sum_{i=1}^{N} \sum_{j=1}^{N} c_{ij} f_{ij}(x, y) \quad (1)$$

where x and y define a location of a given coefficient within a video block and $c_{ij}$ are weight factors, sometimes called prediction error coefficients or residual transform coefficients. The residual transform coefficients or weights $c_{ij}$ may be subsequently quantized as follows:

$$l_{ij} = Q(c_{ij}, QP) \quad (2)$$

where $l_{ij}$ are the quantized coefficients or levels and $Q(c_{ij}, QP)$ is a function that quantizes $c_{ij}$ with a quantization parameter QP. The function $Q(c_{ij}, QP)$ may divide $c_{ij}$ by a value derived according to QP and location (i, j) within a quantization matrix that defines a quantization step size. The quantization operation may introduce loss of information. However, the quantized coefficients can be represented with a smaller number of bits, thereby conserving transmission bandwidth, storage space and processing resources. The level of compression (loss of information) is conventionally controlled by adjusting the value of QP.

On the decoder side, the block in the current frame is obtained by first constructing a prediction block in the same manner as in video encoder 50 and by adding to the prediction block the decoded prediction error or residual block. The prediction error or residual block is obtained by entropy decoding the encoded bitstream, applying inverse quantization and inverse transform operations. Inverse quantization (or de-quantization) may be performed to obtain de-quantized coefficients $r_{ij}$, e.g., in accordance with equation:

$$r_{ij} = Q^{-1}(l_{ij}, QP), \qquad (3)$$

where $Q^{-1}(l_{ij}, QP)$ represents a function that dequantizes $l_{ij}$ with a quantization parameter QP. The function $Q(l_{ij}, QP)$ may multiply $l_{ij}$ byt a value derived according to QP and location (i, j) within an inverse quantization matrix that defines a quantization step size. The inverse transform operations may be performed to obtain the reconstructed residual block or reconstructed prediction error, which represents the difference between the reconstructed block R(x, y) and the original block I(x, y). In one example, the reconstructed version of the residual block or prediction error $\tilde{E}(x, y)$ may be obtained by applying the following function to the de-quantized coefficients $r_{ij}$:

$$\tilde{E}(x, y) = \sum_{i=1}^{N} \sum_{j=1}^{N} r_{ij} \tilde{f}_{ij}(x, y) \qquad (4)$$

where $\tilde{f}(x, y)$ are inverse transform basis functions.

Conventionally, quantization of transform coefficients in video codecs is usually based on uniform-reconstruction quantizers (URQ). The classification rule for quantizing the data is defined by the encoder. One example of quantization is a so-called dead-zone plus uniform threshold quantization (DZ-UTQ) approach. The equation below defines such a dead-zone quantizer, where $f_0$ denotes the dead-zone parameter with $0 \le f_0 \le 0.5$:

$$l_{ij} = \text{sgn}(c_{ij}) \cdot \left\lfloor \frac{|c_{ij}|}{QP} + f_0 \right\rfloor, \qquad (5)$$

where $l_{ij}$ corresponds to a quantization level or quantization coefficient value, sgn(N) is a signum function that extracts the sign of the real number N, and $\lfloor M \rfloor$ is a floor function that returns a largest integer less than or equal to M.

Conceptually, the reconstruction value or de-quantized coefficient value $r_{ij}$ that corresponds to the level $l_{ij}$ may be derived by multiplying $l_{ij}$ with the corresponding QP:

$$r_{ij} = l_{ij} \cdot QP \qquad (6)$$

Equations (5) and (6) represent a mathematically simplified version of what is actually specified for H.264/MPEG-4 Part 10 AVC standard, since the different scaling factors for normalization of the corresponding basis functions are neglected for purposes of simplicity.

In the H.264/MPEG-4 Part 10 AVC standard, quantization may be performed according to the following equation:

$$l_{ij} = \text{sgn}(c_{ij})[|c_{ij}| \cdot Q(QP \%6, i, j) + f]/2^{15 + QP/6}, i, j = 0, \ldots, 3 \qquad (7)$$

where Q represents a quantization matrix of quantization step sizes, % represents modular division, and f is equal to $2^{15+QP/6}/3$ for intra-coded frames and $2^{15+QP/6}/6$ for inter-coded frames. De-quantization or inverse quantization of coefficients may be performed according to the following equation:

$$r_{ij} = l_{ij} \cdot R(QP, i, j), i, j = 0, \ldots, 3 \qquad (8)$$

where $r_{ij}$ represents de-quantized coefficient values at location (i, j) in the video block, R represent the de-quantization step sizes. R may, for example, be equivalent to $Q^{-1}$ of equation (3). In some embodiments, the values associated with Q and R for QP and may be pre-calculated and stored.

Figure 7:
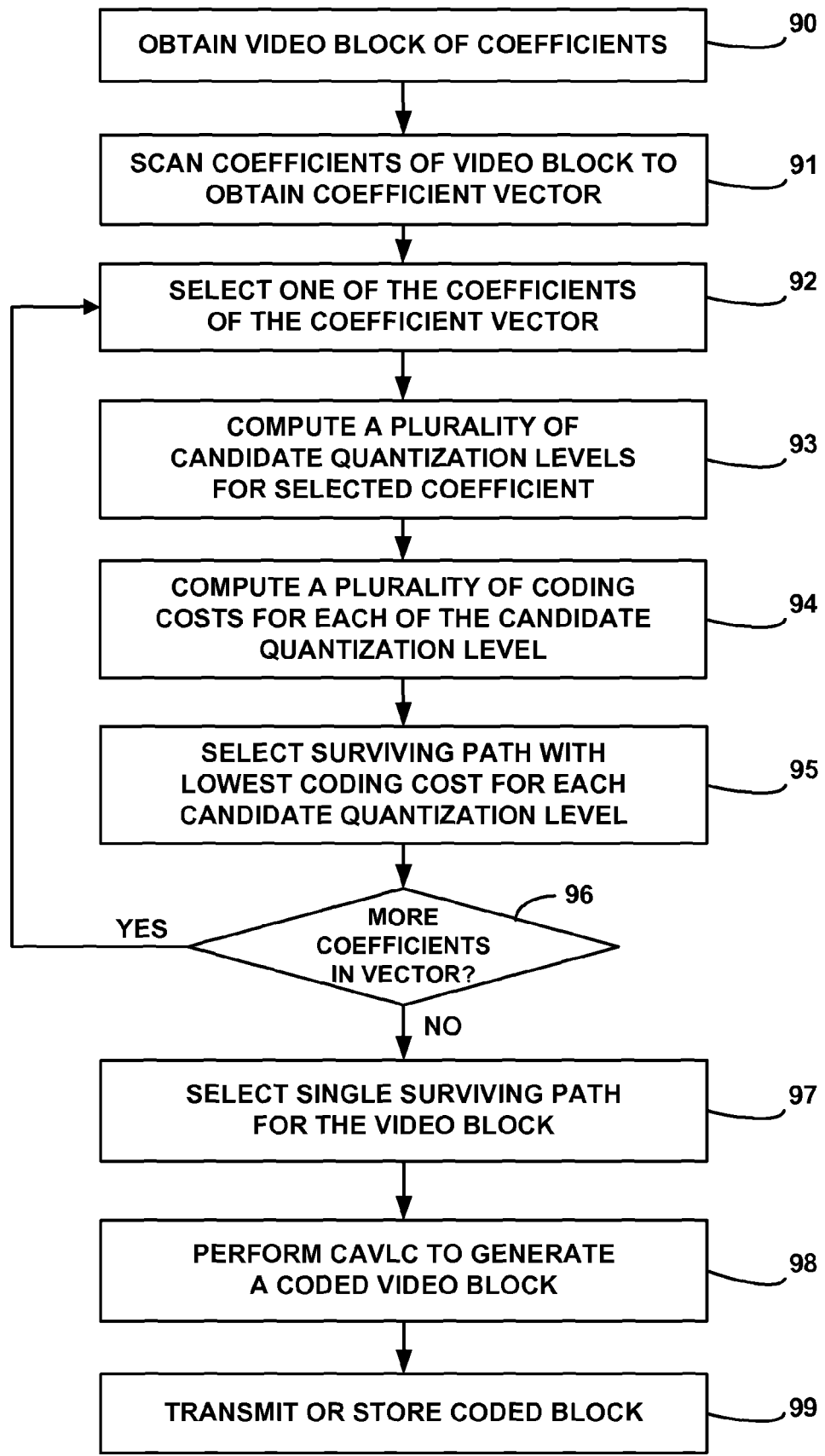
FIG. 7 is a flow diagram illustrating example operation of a video encoder performing quantization in accordance with another quantization technique of this disclosure.

Residual transform coefficients in a given block may be ordered (scanned) using zigzag scanning or another scanning order, resulting in a one-dimensional ordered coefficient vector. Scanning, such as zigzag scanning, may also be referred to as serialization, in that it produces a one-dimensional series of coefficients from a two-dimensional pattern defined by the block. An example zigzag scan for a 4×4 block appears in FIG. 3. The scanning order for such zigzag scanning shown in FIG. 3 follows the arrow through video block 56. In particular, coefficients $C_1$-$C_{16}$ are labeled in the scanning order and the numerical values shown in FIG. 3 indicate positions of the coefficients within a sequential one-dimensional vector, and do not represent actual values of the coefficients. The result of the zigzag scanning illustrated in FIG. 7 is a one-dimensional coefficient vector X, where $X = [C_1, C_2, C_3, C_4, C_5, C_6, C_7, C_8, C_9, C_{10}, C_{11}, C_{12}, C_{13}, C_{14}, C_{15}, C_{16}]$ where $C_1$-$C_{16}$ represent coefficient positions within the two-dimensional array of coefficients.

Figure 3:
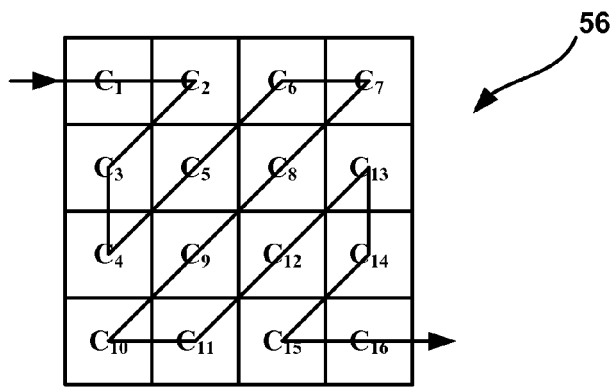
FIG. 3 is a conceptual diagram illustrating zig-zag scanning of a four-by-four video block.

Zigzag scanning generally presumes that after applying a two-dimensional (2D) transform, the transform coefficients having most energy (i.e. higher value coefficients) correspond to low frequency transform functions and are located towards the top-left of the block as it is depicted in FIG. 3. Hence, in a coefficient vector produced through zigzag scanning, the higher magnitude coefficients will most likely appear towards the start of the one-dimensional ordered coefficient vector. After quantization, most of the low energy coefficients may be equal to 0.

The techniques of this disclosure are not limited to any particular scanning order or scanning technique. For example, the scanning order used in this disclosure may be the zigzag scanning order shown in FIG. 3. Alternatively, the scanning orders used in this disclosure may be other scanning orders, such as horizontal scanning, vertical scanning, or any other scanning technique. In some cases, the scanning order may adapt based on the content of previously scanned blocks, or based on previously scanned blocks corresponding to the same coding mode used to code the current video block. In one embodiment, the coefficients may be arranged based on the magnitude of their pre-quantization values (e.g., residual transform coefficient values). For example, the resulting coefficient vector may be arranged such that the coefficients having smallest magnitude appear toward the start of the coefficient vector. The coefficients ordered according to this criterion will be denoted by $c_i$, where i=1, . . . , M (M is equal to 16 for 4×4 blocks and 64 for 8×8 blocks).

CAVLC is one method of entropy coding quantized coefficients. In accordance with CAVLC as defined in the H.264/MPEG-4, Part 10 AVC standard, CAVLC encoding unit 46 encodes a total number of coefficients in the coefficient vector, a number of trailing ones in the coefficient vector, signs of each of the trailing ones, magnitudes (or levels) of nonzero coefficients other than the trailing ones, sum of all runs (i.e., the total number of runs before the last nonzero coefficient), and a run length of zeros before each nonzero coefficient.

For each block of transform coefficients, it is desirable to find quantized coefficients or quantization levels such that a distortion metric is minimized subject to a maximum target coding-bit-rate constraint, or equivalently, the coding bit rate is minimized subject to a maximum allowable distortion constraint. Thus, it is desirable to minimize the distortion metric D between the prediction error E(x, y) and reconstructed version of the prediction error $\tilde{E}(x,y)$ subject to a total coding-bit budget of $R_{budget}$:

$$\min[D(E(x,y)-\tilde{E}(x,y))] \text{ subject to } R<R_{budget} \qquad (9)$$

The distortion metric D may be a mean-squared-error (MSE) distortion, an activity-weighted MSE, or another distortion metric.

This so-called "hard" constrained thresholding problem can be solved by converting it to an "easy" equivalent unconstrained problem by "merging" rate and distortion through the Lagrange multiplier λ. The unconstrained thresholding problem becomes the determination (for a fixed λ) of the coefficient levels which minimizes the total Lagrangian Cost, J(λ), defined as:

$$J(\lambda)=D(E(x,y)-\tilde{E}(x,y))+\lambda R \qquad (10)$$

Thus, the equation $J(\lambda)=D(E(x, y)-\tilde{E}(x, y))+\lambda R$ may form a rate-distortion model that collectively minimizes rate and distortion.

In the case of a encoder that conforms with H.264, the squared reconstruction error $(E(x,y)-\tilde{E}(x,y))^2$ for a given block is proportional to the squared quantization error:

$$\sum_{i=1}^{N}\sum_{j=1}^{N}(r_{ij}-c_{ij})^2 \qquad (11)$$

Since the transform used in the H.264 standard is orthogonal the Lagrangian cost J(λ) can be calculated as:

$$J(\lambda)=\sum_{i=1}^{N}\sum_{j=1}^{N}J(\lambda, c_{ij}, l_{ij}). \qquad (12)$$

where $J(\lambda, c_{ij}, l_{ij})$ is Lagrangian cost of the coefficient $c_{ij}$ when quantized to level $l_{ij}$:

$$J(\lambda,c_{ij},l_{ij})=\text{err}(c_{ij},l_{ij})+\lambda \cdot \text{bits}(l_{ij}) \qquad (13)$$

The quantization error err($c_{ij}$, $l_{ij}$) is proportional to $(r_{ij}-c_{ij})^2$:

$$\text{err}(c_{ij},l_{ij})=N(QP,i,j)\cdot(r_{ij}-c_{ij})^2. \qquad (14)$$

As in case of quantization and de-quantization matrices Q and $Q^{-1}$ (or R), values of normalization matrix N(QP,i,j) depend only on the location in the block (specified by i and j) and on value of QP. The number of bits bits($l_{ij}$) required to code the quantization value $l_{ij}$ can be calculated, for example, by encoding $l_{ij}$ with the CAVLC algorithm briefly described above.

For at least a portion of the non-zero coefficients, RD quantization unit 40 analyzes more than one candidate quantization level. RD quantization unit 40 will be described below as analyzing three candidate quantization levels for purposes of illustration. However, RD quantization unit 40 may analyze any number of candidate quantization levels. Therefore the techniques of this disclosure should not be limited to three candidate quantization levels. In one example, RD quantization unit 40 may analyze three candidate quantization levels |l$_{ij}$|:0, $l_{ij}^M$ and $l_{ij}^M$–1, where $l_{ij}^M$ represents a maximum quantization level for the coefficient. In another example, RD quantization unit 40 may analyze three candidate quantization levels |l$_{ij}$|: 0, 1, and $l_{ij}^M$. The maximum quantization level, $l_{ij}^M$, may be calculated for a 4×4 block as:

$$l_{ij}^M = \left\lfloor |c_{ij}| \cdot Q(QP \% 6, i, j)/2^{15+QP/6} + \frac{1}{2} \right\rfloor. \qquad (15)$$

In one aspect, RD quantization unit 40 may use the single pass approach briefly described above to select the quantization level of each individual coefficient from a plurality of candidate quantization levels. RD quantization unit 40 may compute coding costs for all of the candidate quantization levels associated with the individual coefficients and select the candidate quantization level with the lowest coding cost as the quantization level for the individual coefficient currently being analyzed. RD quantization unit 40 may sequentially perform this process until quantization levels have been selected for each of the individual coefficients of the coefficient vector.

In the examples described above in which each individual coefficient is associated with three candidate quantization levels, e.g., 0, $l_{ij}^M$ and $l_{ij}^M$–1 or 0, 1, and $l_{ij}^M$, RD quantization unit 40 computes three coding costs for the individual coefficient. Each of the three coding costs corresponds with a different one of the possible candidate quantization levels. RD quantization unit 40 may compute the cost in accordance with the Lagrange cost function of equation (10) or (13). RD quantization unit 40 sequentially performs the quantization technique described above for each of the individual coefficients of the vector to select a set of quantization coefficients (or levels) that reduce, and often minimize, the coding cost.

CAVLC may encode information related to several coefficients into a single syntax element. For example, the syntax element "coeff token" as defined in the H.264 standard encodes a number of all nonzero coefficients in the quantized vector. As such, CAVLC does not encode each coefficient independently. Therefore, in order to determine the number of bits that CAVLC uses to encode the vector of quantized coefficients each of the coefficients of the vector must be known to compute the cost. The quantization level of the current coefficient is equal to one of the candidate quantization levels being analyzed and is therefore known. The quantization levels of the coefficients preceding the current coefficient in the coefficient vector are also know, as they are previously selected. However, the quantization levels of coefficients that are subsequent to the current coefficient in the coefficient vector have not been selected and are therefore not readily known.

RD quantization unit 40 may, however, compute estimates for the quantization level of these subsequent coefficients. In one example, RD quantization unit 40 may set the quantization level of the subsequent coefficients equal to $l_{ij}^M$ as defined by equation (15) above. In another example, RD quantization unit 40 may compute pre-quantization values $l_{ij}^{prequant}$ as:

$$l_{ij}=\text{sgn}(c_{ij})[|c_{ij}|\cdot Q(QP\%6,i,j)+f]/2^{15+QP/6}, \qquad (16)$$

where f could be equal to $2^{15+QP/6}/3$ for intra and $2^{15+QP/6}/6$ for inter frames. Other values for f based on coefficient statistics could also be used.

In another aspect, RD quantization unit 40 may use a multiple pass approach to select a set of quantization coefficients (or levels) that reduce, and often minimize, the coding cost of the coefficients. In this approach, RD quantization unit 40 may compute a plurality of coding costs for each candidate quantization level associated with the individual coefficient. In other words, each individual coefficient is associated with a plurality of candidate quantization levels and each of the candidate quantization levels is associated with a plurality of coding costs. The quantization levels may be selected by identifying the combination of quantization levels that minimizes the rate-distortion function.

Figure 4:
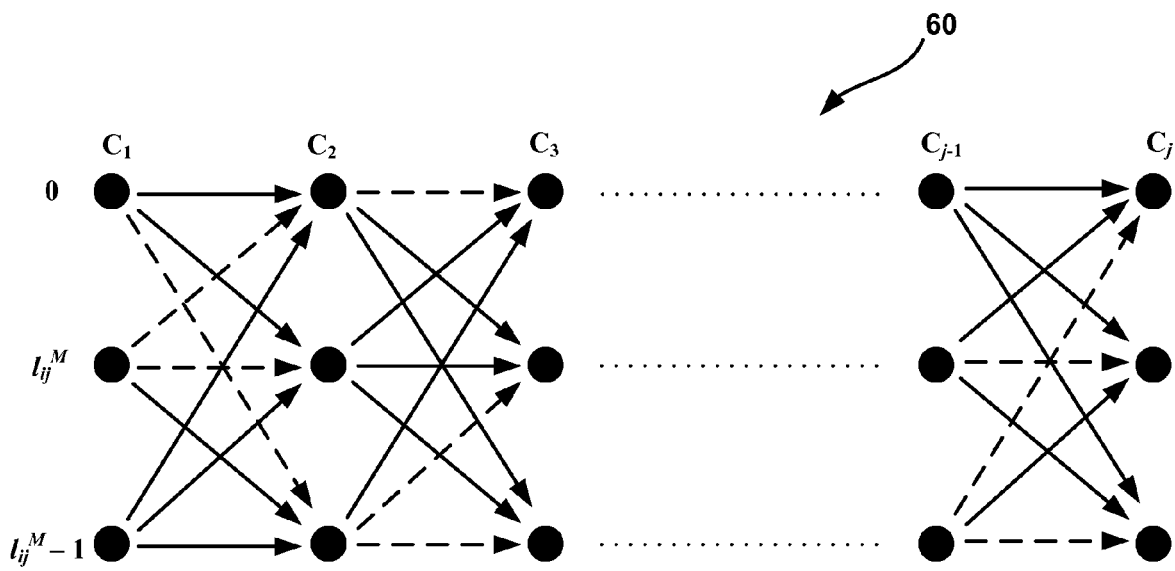
FIG. 4 is a block diagram illustrating a quantization trellis consistent with this disclosure.

As an example, RD quantization unit 40 may implement the multiple pass approach to minimize the rate-distortion function using a quantization trellis 60, as illustrated in FIG. 4. Quantization trellis 60 has j stages, with each stage corresponding to an individual coefficient of the coefficient vector. For a 4×4 block, for example, j=16. Each of the j stages has three states, represented by the three black circles, that each corresponds with a candidate quantization level of the individual coefficient associated with the stage. In the example illustrated in FIG. 4, the three states (circles) of each stage represent candidate quantization levels $0$, $l_{ij}^M$, and $l_{ij}^M-1$. Alternatively, the three states (circles) of each stage may represent other candidate quantization levels, such as 0, 1 and $l_{ij}^M$. Moreover, as described above, each of the stages may include more or fewer states, e.g., two candidate quantization levels or more than three candidate quantization levels.

A path through quantization trellis 60 represents a sequence of quantization decisions on all the coefficients in a block, i.e., a set of quantization coefficients (or levels). RD quantization unit 40 may use Viterbi's algorithm to find the surviving paths through quantization trellis 60. Viterbi's algorithm is a dynamic programming algorithm for finding the most likely sequence of hidden states (or Viterbi path) that result in a sequence of observed events. Viterbi's algorithm makes a number of assumptions. First, both the observed events and hidden events must be in a sequence. This sequence often corresponds to time. Second, these two sequences need to be aligned, and an instance of an observed event needs to correspond to exactly one instance of a hidden event. Third, computing the most likely hidden sequence up to a certain point t must depend only on the observed event at point t, and the most likely sequence at point t−1.

In each stage of quantization trellis 60, RD quantization unit 40 computes costs, e.g., according to the Lagrangian cost function of equation (Error! Reference source not found.) or (13), for each of the candidate quantization levels based on each surviving path up to the current individual coefficient and estimated quantization levels of subsequent coefficients. For the coefficients in the current stage and the past stages along each surviving path, RD quantization unit 40 has the quantization level information. The quantization levels of the future stages (i.e., subsequent coefficients) may be assigned predicted quantization levels $l_{ij}^M$ or $l_{ij}^{prequant}$ computed using equations (15) and (16), respectively, or other estimated or predicted quantization level.

At the second stage of quantization trellis 60, for example, which corresponds with coefficient $C_2$, RD quantization unit 40 computes coding costs for each combination of candidate quantization levels associated with coefficients $C_1$ and $C_2$. Using candidate quantization levels of $0$, $l_{ij}^M$ and $l_{ij}^M-1$ as an example, RD quantization unit 40 computes three coding costs for each candidate quantization level associated with coefficient $C_2$. For candidate quantization level 0 associated with coefficient $C_2$, RD quantization unit 40 computes a first coding cost using quantization levels $l_1=0$, $l_2=0$, and $l_3-l_j$ equal respective predicted/estimated quantization levels $l_{ij}^M$ or $l_{ij}^{prequant}$ (where $l_1$, $l_2$, $l_3$, ..., $l_j$ are selected, candidate and/or predicted quantization levels associated with $C_1$, $C_2$, $C_3$, ..., $C_j$, respectively), a second coding cost using quantization levels $l_1=l_{ij}^M$, $l_2=0$, and $l_3-l_j$ equal respective predicted/estimated quantization levels, and a third coding cost using quantization levels $l_1=l_{ij}^M-1$, $l_2=0$, and $l_3-l_j$ equal respective predicted/estimated quantization levels. RD quantization level 40 selects the path having the lowest computed coding cost as the surviving path for coefficient quantization level 0 associated with coefficient $C_2$.

Likewise, RD quantization unit 40 computes first, second and third coding costs for candidate quantization level $l_{ij}^M$ associated with coefficient $C_2$ using $l_1=0$, $l_{ij}^M$ and $l_{ij}^M-1$, respectively, and $l_3-l_j$ equal respective predicted quantization levels. RD quantization unit 40 selects the path having the lowest computed coding cost as the surviving path for coefficient quantization level $l_{ij}^M-1$ associated with $C_2$. RD quantization unit 40 also computes first, second and third coding costs for candidate quantization level $l_{ij}^M-1$ associated with coefficient $C_2$ using $l_1=0$, $l_{ij}^M$ and $l_{ij}^M-1$, respectively, and $l_3-l_j$ equal respective predicted quantization levels. RD quantization unit 40 selects the path having the lowest computed coding cost as the surviving path for coefficient quantization level $l_{ij}^M-1$ associated with coefficient $C_2$. For purposes of example, assume that the surviving path for quantization level 0 associated with coefficient $C_2$ is the path that includes $l_1=l_{ij}^M$, the surviving path for quantization level $l_{ij}^M$ associated with coefficient $C_2$ is the path that includes $l_1=l_{ij}^M$ and the surviving path for quantization level $l_{ij}^M-1$ associated with coefficient $C_2$ is the path that includes $l_1=0$. The surviving paths are illustrated in quantization trellis 60 of FIG. 4 as dotted lines.

After selecting the surviving paths for coefficient $C_2$, RD quantization unit 40 determines the quantization level associated with the next (subsequent) coefficient of the coefficient vector, e.g., $C_3$ in the example of FIG. 4. RD quantization unit 40 computes a plurality of coding costs for each of the candidate quantization levels associated with coefficient $C_3$ using the surviving paths and predicted/estimated quantization levels of subsequent coefficients. Based on the computed costs, RD quantization unit 40 selects surviving paths associated with each candidate coefficient based on the computed coding cost. In the example illustrated in FIG. 4, the surviving path for quantization level 0 associated with coefficient $C_3$ is $l_{ij}^M$, 0, and 0 for quantization levels of $C_1$, $C_2$ and $C_3$, respectively, the surviving path for quantization level $l_{ij}^M$ associated with coefficient $C_3$ is 0, $l_{ij}^M-1$, and $l_{ij}^M$ for quantization levels of $C_1$, $C_2$ and $C_3$, respectively, and the surviving path for quantization level $l_{ij}^M-1$ associated with coefficient $C_3$ is 0, $l_{ij}^M-1$, and $l_{ij}^M-1$ for quantization levels of $C_1$, $C_2$ and $C_3$, respectively.

RD quantization unit 40 continues to select surviving paths of quantization levels until the last coefficient of the coefficient vector, e.g., $C_j$. RD quantization unit 40 selects the single quantization level associated with the last coefficient that has the lowest coding cost, which corresponds to the surviving path through quantization trellis 60 that represents a sequence of quantization decisions on all the coefficients in a block. Although this technique requires more computational resources than the single pass technique described above, the result may be more accurate.

In order to accelerate the quantization process, quantization unit 40 may implement one or more acceleration techniques. For example, for an individual one of the quantized coefficients, if the individual one of the quantized coefficients is closer to quantization level 0 than quantization level 1, quantization unit 40 may quantize the associated coefficient to quantization level 0 without any further analysis. In other words, the individual coefficient has only one state corresponding to quantization level 0 in the trellis and quantization unit 40 may skip calculation of coding costs associated with the candidate quantization levels associated with the individual coefficient. These or other techniques may be used to accelerate the quantization process with little, if any, degradation in quality of the encoded video.

Figure 5:
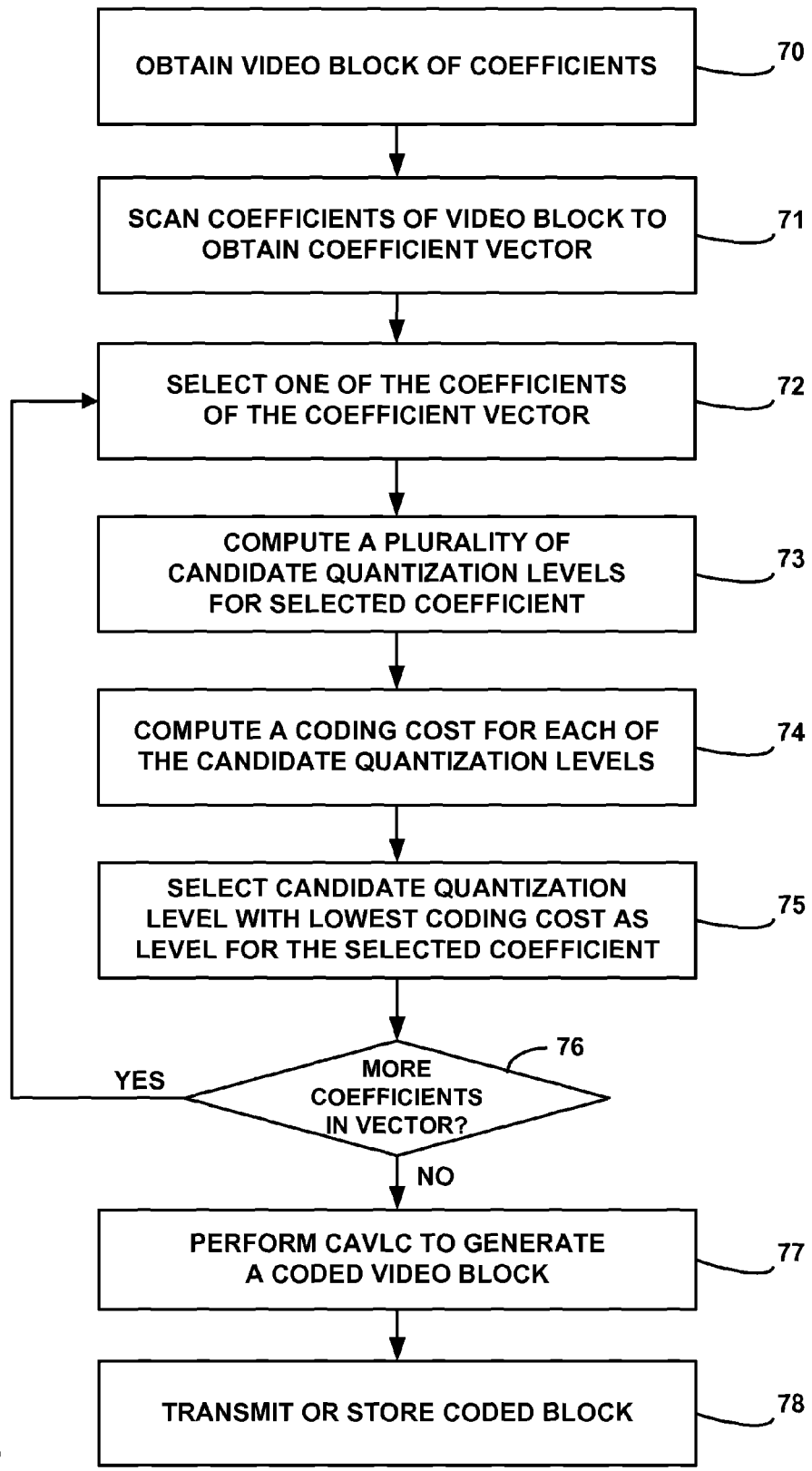
FIG. 5 is a flow diagram illustrating example operation of a video encoder performing quantization in accordance with one quantization technique of this disclosure.

FIG. 5 is a flow diagram illustrating example operation of a video encoder performing quantization in accordance with one quantization technique of this disclosure. The video encoder may, for example, comprise video encoder 50 of FIG. 2. RD quantization unit 40 of video encoder 50 obtains a video block of coefficients (70). The video block of coefficients may be formed by subtracting a prediction video block generated by prediction unit 32 from the original video block to be encoded to obtain a block of pixel difference values and then applying a transform operation, such as a DCT, to the block of pixel difference values to obtain a block of transform coefficients.

RD quantization unit 40 or other component scans the coefficients of the video block to obtain a one-dimensional vector of coefficients (i.e., a coefficient vector) (71). RD quantization unit 40 may scan the coefficients of the video block using zigzag scanning as described with respect to FIG. 3 or another scanning order. As another example, RD quantization unit 40 may scan the coefficients of the coefficient vector to arrange the coefficients as a function of magnitude. The result of this scanning technique may result in the coefficients of the video block being arranged in the coefficient vector such that the coefficients having smallest magnitude appear toward the start of the coefficient vector.

RD quantization unit 40 may select one of the coefficients of the coefficient vector to analyze (72). RD quantization unit 40 may select the coefficients sequentially beginning with the first coefficient of the vector and ending with the last coefficient of the vector. Thus, the first coefficient selected would be coefficient $C_1$. As another example, RD quantization unit 40 may select the coefficients sequentially beginning with the last coefficient of the vector and ending with the first coefficient of the vector. RD quantization unit 40 computes a plurality of candidate quantization levels for the selected coefficient (73). In one example, RD quantization unit may compute three candidate quantization levels for the selected coefficient. As described above, RD quantization unit 40 may compute three candidate quantization levels $|l_{ij}|$: 0, $l_{ij}^M$ and $l_{ij}^M-1$, where:

$$l_{ij}^M = \left\lfloor |c_{ij}| \cdot Q(QP\ \%\ 6, i, j)/2^{15+QP/6} + \frac{1}{2} \right\rfloor.$$

In another example, RD quantization unit 40 may compute three candidate quantization levels $|l_{ij}|$: 0, 1, and $l_{ij}^M$. Although the techniques are described in the context of three candidate quantization levels, the quantization techniques of this disclosure should not be limited to a particular number of candidate quantization levels. In other words, RD quantization unit 40 may compute any number of candidate quantization levels associated with the selected coefficient, including two levels or more than three levels. The discussion herein of three candidate quantization levels is merely exemplary.

RD quantization unit 40 may compute a coding cost for each of the candidate quantization levels associated with the selected coefficient (74). RD quantization unit 40 may compute the cost in accordance with the Lagrange cost function of equation (10) or (13). Because CAVLC does not encode each coefficient independently, the quantization level of each of the coefficients of the vector must be known to determine the number of bits (R from equation (10) or bits($l_{ij}$) from equation (13)) that CAVLC uses to encode the coefficient vector. The quantization levels of the current and preceding coefficients are known; the quantization level of the current coefficient is equal to one of the candidate quantization levels and the quantization levels of the preceding coefficients have been previously selected. The quantization levels of coefficients that are subsequent to the current coefficient are not known since RD quantization unit 40 has yet to analyze those coefficients, but their cost may be predicted or estimated in accordance with equations (15) or (16).

RD quantization unit 40 selects the candidate quantization level with the lowest coding cost as the quantization level for the individual selected coefficient currently being analyzed (75). RD quantization unit 40 determines whether there are more coefficients in the coefficient vector that have yet to be quantized (76). If there are remaining coefficients in the coefficient vector (the "YES" branch of block 76), RD quantization unit 40 selects a quantization level for the coefficient as described above with respect to blocks 72-75. RD quantization unit 40 continues to do so until there are not more coefficients in the coefficient vector that need to be quantized. In this manner, RD quantization unit 40 may sequentially perform the quantization until quantization levels have been selected for each of the individual coefficients of the coefficient vector. Such a quantization technique may enable video encoder 50 to select a set of quantization coefficients (or levels) that reduce, and often minimize, the coding cost for the block.

When there are no more remaining transform coefficients, i.e., all of the coefficients of the coefficient vector are quantized (the "NO" branch of block 76), CAVLC encoding unit 46 entropy codes the quantized transform coefficients, together with prediction syntax (e.g., motion vectors, prediction modes, or other control information), to generate a coded video block (77). Following the entropy coding by CAVLC encoding unit 46, video encoder 40 transmits the encoded video block to another device or stores/archives the encoded video block for later transmission or retrieval (78).

Figure 6:
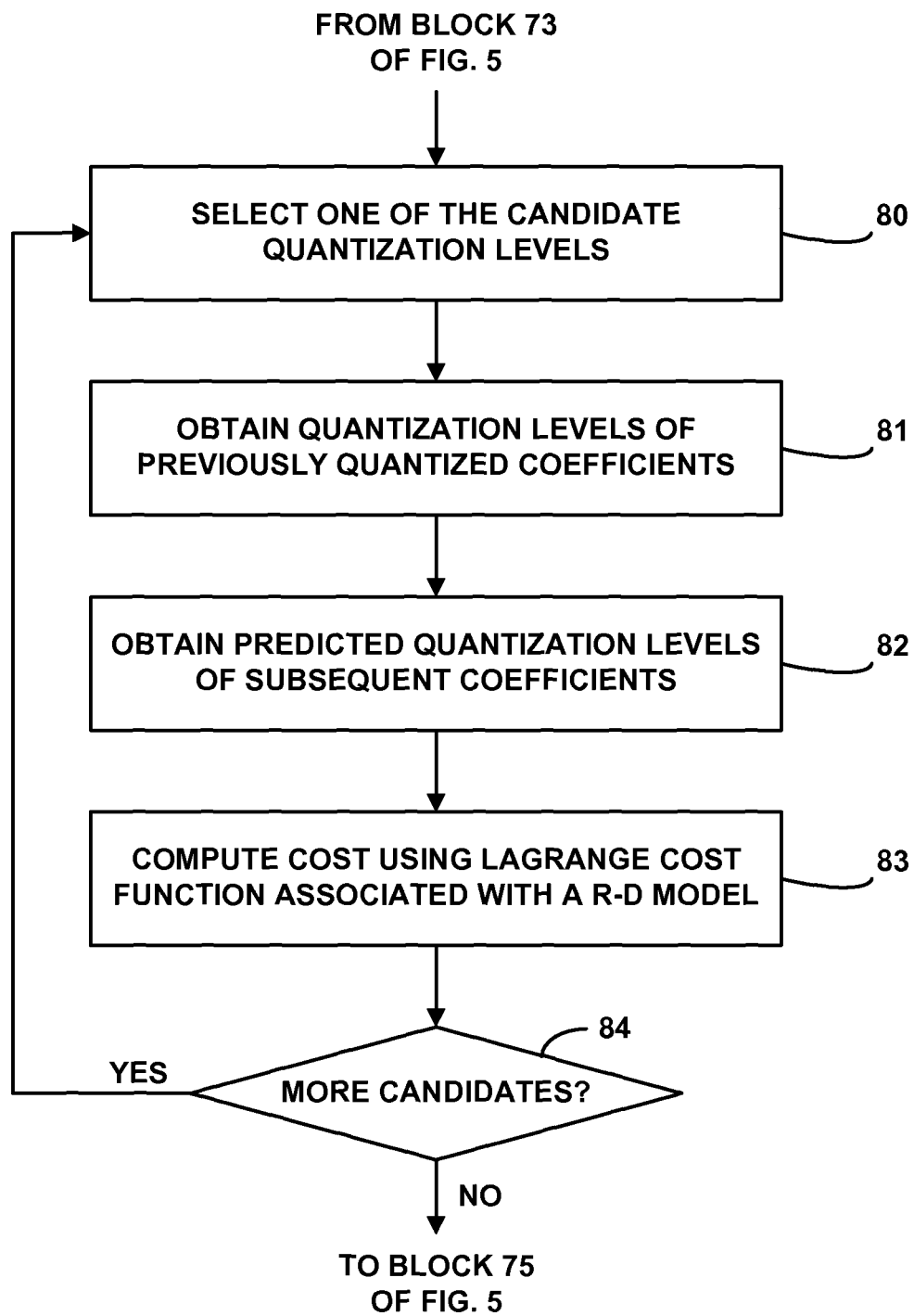
FIG. 6 is a flow diagram illustrating example operation of RD quantization unit computing coding costs for candidate quantization levels in further detail.

FIG. 6 is a flow diagram illustrating example operation of RD quantization unit 40 computing coding costs for candidate quantization levels in further detail. The process shown in FIG. 6 may correspond to block 74 of the process shown in FIG. 5, or may correspond to the computation of coding costs within another context. As shown in FIG. 6, RD quantization unit 40 selects one of the candidate quantization levels associated with the individual coefficient (80). RD quantization unit 81 obtains the quantization levels of any previously quantized coefficients in the coefficient vector (81). The quantization levels of any previously quantized coefficients may be stored within a memory or other storage device.

RD quantization unit 40 obtains predicted (or estimated) quantization levels for subsequent coefficients, e.g., coefficients that have not yet been quantized (82). RD quantization unit 40 may, for example, compute the predicted or estimated quantization levels in accordance with one of the following equations:

$$l_{ij}^M = \left\lfloor |c_{ij}| \cdot Q(QP\ \%\ 6, i, j)/2^{15+QP/6} + \frac{1}{2} \right\rfloor$$

$$l_{ij}^{prequant} = sgn(c_{ij})[|c_{ij}| \cdot Q(QP\ \%\ 6, i, j) + f]/2^{15+QP/6}$$

However, RD quantization unit 40 may use other estimates for the quantization levels of the subsequent coefficients of the coefficient vector.

RD quantization unit 40 computes a coding cost for the selected candidate quantization level using a Lagrange cost function associated with rate-distortion model (83). In one example, RD quantization unit 40 computes the coding cost for the selected candidate quantization level using the Lagrange cost function of equation (10) or (13). RD quantization unit 40 computes the coding cost for the selected candidate quantization level based on the obtained quantization levels associated with the previously quantized coefficients, the selected candidate quantization level and the predicted (or estimated) quantization levels of subsequent coefficients that have not yet been quantized. Because CAVLC does not encode each coefficient independently, the number of bits (R from equation (10) or bits($l_{ij}$) from equation (13)) may only be determined based when quantization levels for each of the coefficients of the vector is known, the costs are computed using the predicted/estimated quantization levels.

RD quantization unit 40 determines whether there are more candidate quantization levels for which coding costs need to be computed (84). If there are remaining candidate quantization levels (the "YES" branch of block 84 of FIG. 6), RD quantization unit 40 selects a next candidate quantization level and computes a coding cost associated with the next candidate quantization level as described above with respect to blocks 80-83 of FIG. 6. RD quantization unit 40 continues to do so until there are no more candidate quantization levels associated with individual coefficient for which to compute coding costs (the "NO" branch of block 84 of FIG. 6). At that point the process reverts back to block 75 of FIG. 5.

FIG. 7 is a flow diagram illustrating example operation of a video encoder performing quantization in accordance with another quantization technique of this disclosure. The video encoder may, for example, comprise video encoder 50 of FIG. 2. RD quantization unit 40 of video encoder 50 obtains a video block of coefficients (90). The video block of coefficients may be formed by subtracting a prediction video block generated by prediction unit 32 from the original video block to be encoded to obtain a block of pixel difference values and then applying a transform operation, such as a DCT, to the block of pixel difference values to obtain a block of transform coefficients.

RD quantization unit 40 or other component scans the coefficients of the video block to obtain a one-dimensional vector of coefficients (i.e., a coefficient vector) (91). RD quantization unit 40 may scan the coefficients of the video block using zigzag scanning as described with respect to FIG. 3 or another scanning order. As another example, RD quantization unit 40 may scan the coefficients of the coefficient vector to arrange the coefficients as a function of magnitude. The result of this scanning technique may result in the coefficients of the video block being arranged in the coefficient vector such that the coefficients having smallest magnitude appear toward the start of the coefficient vector.

RD quantization unit 40 may select one of the coefficients of the coefficient vector to analyze (92). RD quantization unit 40 may select the coefficients sequentially beginning with the first coefficient of the vector and ending with the last coefficient of the vector. Thus, the first coefficient selected would be coefficient $C_1$. As another example, RD quantization unit 40 may select the coefficients sequentially beginning with the last coefficient of the vector and ending with the first coefficient of the vector. RD quantization unit 40 computes a plurality of candidate quantization levels for the selected coefficient (93). In one example, RD quantization unit may compute three candidate quantization levels for the selected coefficient. As described above, RD quantization unit 40 may compute three candidate quantization levels $|l_{ij}|$: 0, $l_{ij}^M$ and $l_{ij}^M - 1$, where:

$$l_{ij}^M = \left\lfloor |c_{ij}| \cdot Q(QP \% 6, i, j)/2^{15+QP/6} + \frac{1}{2} \right\rfloor.$$

In another example, RD quantization unit 40 may compute three candidate quantization levels $|l_{ij}|$: 0, 1, and $l_{ij}^M$. Although the techniques are described in the context of three candidate quantization levels, the quantization techniques of this disclosure should not be limited to a particular number of candidate quantization levels. In other words, RD quantization unit 40 may compute any number of candidate quantization levels associated with the selected coefficient, including two levels or more than three levels.

RD quantization unit 40 may compute a plurality of coding costs for each of the candidate quantization levels associated with the selected coefficient (94). In other words, each individual coefficient is associated with a plurality of candidate quantization levels and each of the candidate quantization levels is associated with a plurality of coding costs. The plurality of coding costs may be computed based on surviving paths associated with previously selected quantization levels of previous coefficients as well predicted or estimated quantization levels for subsequent coefficients. As described above, a surviving path represents a sequence of quantization decisions made for previous coefficients in the vector.

RD quantization unit 40 selects a surviving path with a lowest coding cost for each of the candidate quantization levels (95). As such, the selected coefficient corresponds with three surviving paths, with each surviving path associated with one of the candidate quantization levels associated with the individual coefficient. As one example, RD quantization unit 40 may compute the coding costs for the candidate coefficients and select the surviving path associated with each of the coefficients in accordance with a quantization trellis 60, as illustrated and described in detail with respect to FIG. 4.

RD quantization unit 40 determines whether there are more coefficients in the coefficient vector that have yet to be quantized (96). If there are remaining coefficients in the coefficient vector (the "YES" branch of block 96), RD quantization unit 40 selects a surviving path for each of the quantization levels for the subsequent coefficient as described above with respect to blocks 92-95.

If there are no more remaining transform coefficients, i.e., all of the coefficients of the coefficient vector are quantized (the "NO" branch of block 96), RD quantization unit 40 selects a single surviving path, i.e., the one of the three surviving paths associated with the last coefficient of the vector with the lowest coding cost (97) Such a quantization technique may enable video encoder 50 to select a set of quantization coefficients (or levels) that reduce, and often minimize, the coding cost for the block.

CAVLC encoding unit 46 entropy codes the quantized transform coefficients, together with prediction syntax (e.g., motion vectors, prediction modes, or other control information), to generate a coded video block (98). Following the entropy coding by CAVLC encoding unit 46, video encoder 40 transmits the encoded video block to another device or stores/archives the encoded video block for later transmission or retrieval (99).

Figure 8:
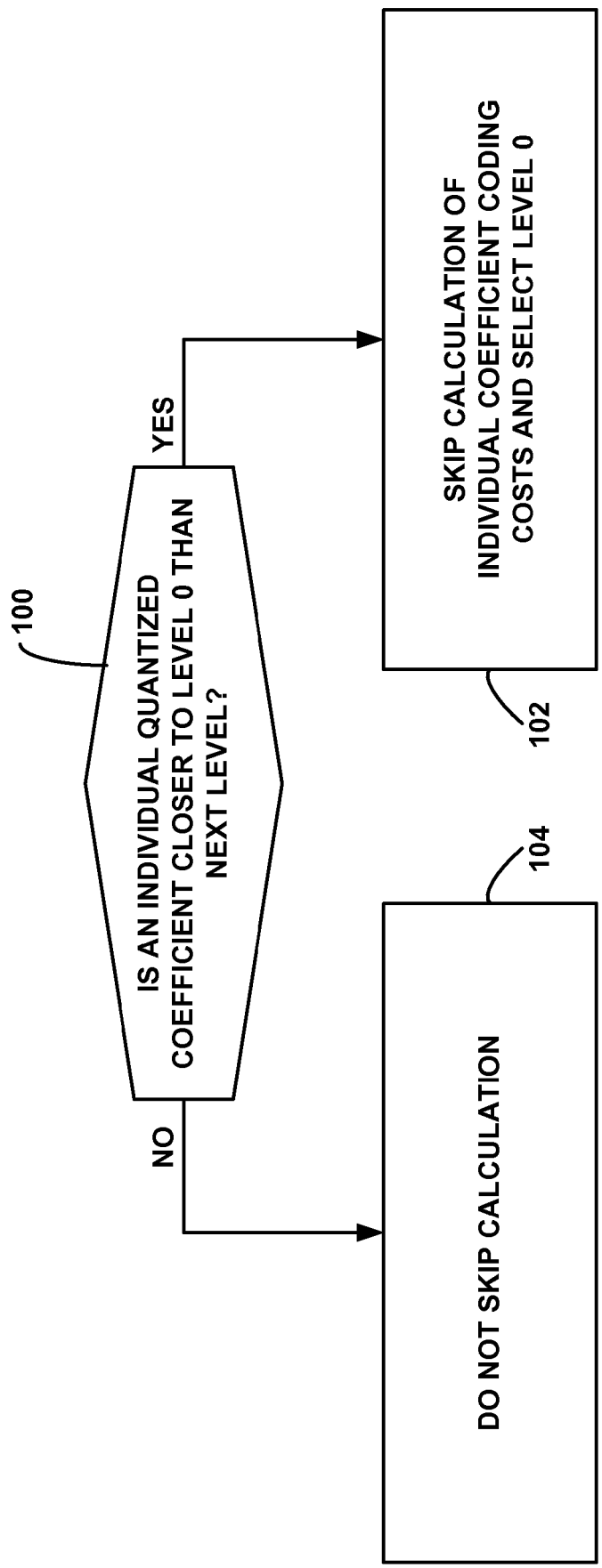
FIG. 8 is a flow diagram illustrating an example technique that may be used to accelerate the quantization process without substantially sacrificing quality in the quantized coefficients.

FIG. 8 is a flow diagram illustrating an example technique that may be used to accelerate the quantization process without substantially sacrificing quality in the quantized coefficients. The acceleration technique described in FIG. 8 may be most applicable to the one-pass quantization process, may also be useful in the multiple-pass quantization process. As shown in FIG. 8, RD quantization unit 40 may determine if an individual quantized coefficient is closer to quantization level 0 than to a next highest candidate quantization level (100). In the example in which the candidate quantization levels are 0, 1, and $1_{ij}^M$, for example, RD quantization unit 40 may determine whether the individual quantized coefficient is closer to candidate quantization level 0 than to candidate quantization level 1.

If the individual quantized coefficient is closer to quantization level 0 than to a next highest candidate quantization level, e.g., quantization level 0 ("YES" branch of 100), RD quantization unit 40 may skip calculation of individual coefficient coding costs associated with each quantization level and instead select quantization level 0 without any further analysis (102). In this case, RD quantization unit 40 may assume that the individual coefficient coding cost associated with the individual quantized coefficient will be minimized at quantization level 0. Accordingly, in this case, RD quantization unit 40 may avoid the unnecessary computations associated with calculation of coding costs associated with each of the candidate quantization levels. If the individual quantized coefficient is not closer to quantization level 0 than to a next highest candidate quantization level, e.g., quantization level 1, ("NO" branch of 100), RD quantization unit 40 may not skip the computation of the coding costs associated with the candidate quantization levels associated with the individual coefficient (104).

The techniques of this disclosure may be embodied in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units, components or modules.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials. The computer-readable medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of quantizing at least a portion of coefficients of a video block in a video coding process, the method comprising:
    determining, for each respective coefficient of the portion of the coefficients of the video block, coding costs for a plurality of candidate quantization levels associated with the respective coefficient, wherein the coding costs for the candidate quantization levels associated with the respective coefficient are based at least in part on predicted quantization levels of non-quantized coefficients subsequent to the respective coefficient, wherein the predicted quantization levels of the non-quantized coefficients subsequent to the respective coefficient are based at least in part on coefficient values of the coefficients subsequent to the respective coefficient; and
    selecting one of the plurality of the candidate quantization levels for each respective coefficient of the portion of the coefficients based on the coding costs for the plurality of candidate quantization levels associated with the respective coefficient, thereby obtaining a set of quantized coefficients.

2. The method of claim 1,
    wherein determining the coding costs further comprises computing a plurality of coding costs for each of the candidate quantization levels associated with the respective coefficient based on surviving paths associated with a previous coefficient, the respective candidate quantization level associated with the respective coefficient, and the predicted quantization levels of the non-quantized coefficients subsequent to the respective coefficient, wherein the surviving paths represent sequences of quantization decisions for coefficients preceding the respective coefficient in the video block; and
    wherein selecting the one of the plurality of candidate quantization levels comprises for each respective coefficient of the portion of the coefficients, selecting a surviving path for each of the candidate quantization levels associated with the respective coefficient corresponding to a lowest coding cost of the plurality of the coding costs for each of the candidate quantization levels associated with the respective coefficient.

3. The method of claim 2, further comprising selecting, for a last coefficient of the video block, a surviving path with a lowest coding cost from a plurality of surviving paths of candidate quantization levels associated with the last coefficient.

4. The method of claim 1, further comprising calculating at least one of the plurality of candidate quantization levels of the respective coefficient based on an absolute value of the respective coefficient, a quantization parameter, and a quantization matrix.

5. The method of claim 4, wherein the plurality of candidate quantization levels include quantization level zero.

6. The method of claim 5, further comprising skipping determination of coding costs for a plurality of candidate quantization levels associated with a particular coefficient of the video block if a quantized version of the particular coefficient is closer to the quantization level zero than quantization level one.

7. The method of claim 1, further comprising:
performing context adaptive variable length coding (CAVLC) on the set of quantized coefficients to entropy encode the set of quantized coefficients into a bitstream; and
outputting the encoded bitstream.

8. The method of claim 1, wherein the predicted quantization levels of the non-quantized coefficients subsequent to the respective coefficient are based at least in part on an estimated maximum quantization level.

9. The method of claim 1, wherein the predicted quantization levels of the non-quantized coefficients subsequent to the respective coefficient are based at least in part on coefficient statistics.

10. A apparatus for quantizing at least a portion of coefficients of a video block in a video coding process, the apparatus comprising:
a quantization unit that:
determines, for each respective coefficient of the portion of the coefficients of the video block, coding costs for a plurality of candidate quantization levels associated with the respective coefficient, wherein the coding costs for the candidate quantization levels associated with the respective coefficient are based at least in part on predicted quantization levels of non-quantized coefficients subsequent to the respective coefficient, wherein the predicted quantization levels of the non-quantized coefficients subsequent to the respective coefficient are based at least in part on coefficient values of the coefficients subsequent to the respective coefficient; and
selects one of the plurality of the candidate quantization levels for each respective coefficient of the portion of the coefficients based on the coding costs for the plurality of candidate quantization levels associated with the respective coefficient, thereby obtaining a set of quantized coefficients.

11. The apparatus of claim 10, wherein the quantization unit:
computes a plurality of coding costs for each of the candidate quantization levels associated with the respective coefficient based on surviving paths associated with a previous coefficient, and the respective candidate quantization level associated with the respective coefficient, and the predicted quantization levels of the non-quantized coefficients subsequent to the respective coefficient, wherein the surviving paths represent sequences of quantization decisions for coefficients preceding the respective coefficient in the video block; and
selects a surviving path for each of the candidate quantization levels associated with the respective coefficient corresponding to a lowest coding cost of the plurality of coding costs for each of the candidate quantization levels associated with the respective coefficient.

12. The apparatus of claim 11, wherein the quantization unit selects, for a last coefficient of the video block, a surviving path with a lowest coding cost from a plurality of surviving paths of candidate quantization levels associated with the last coefficient.

13. The apparatus of claim 10, wherein the quantization unit calculates at least one of the plurality of candidate quantization levels of the respective coefficient based on an absolute value of the respective coefficient, a quantization parameter, and a quantization matrix.

14. The apparatus of claim 13, wherein the plurality of candidate quantization levels include quantization level zero.

15. The apparatus of claim 14, wherein the quantization unit skips determination of coding costs for a plurality of candidate quantization levels associated with a particular coefficient of the video block if a quantized version of the particular coefficient is closer to the quantization level zero than quantization level one.

16. The apparatus of claim 10, further comprising:
an entropy encoder that performs context adaptive variable length coding (CAVLC) on the set of quantized coefficients to entropy encode the set of quantized coefficients into a bitstream; and
a transmitter to transmit the encoded bitstream.

17. The apparatus of claim 10, wherein the apparatus is incorporated within a wireless communication device.

18. The apparatus of claim 10, wherein the apparatus comprises an integrated circuit.

19. The apparatus of claim 10, wherein the predicted quantization levels of the non-quantized coefficients subsequent to the respective coefficient are based at least in part on an estimated maximum quantization level.

20. The apparatus of claim 10, wherein the predicted quantization levels of the non-quantized coefficients subsequent to the respective coefficient are based at least in part on coefficient statistics.

21. A non-transitory computer-readable medium comprising instructions that upon execution cause a device to quantize at least a portion of coefficients of a video block in a video coding process, wherein the instructions cause the device to:
determine, for each respective coefficient of the portion of the coefficients of the video block, coding costs for a plurality of candidate quantization levels associated with the respective coefficient, wherein the coding costs for the candidate quantization levels associated with the respective coefficient are based at least in part on predicted quantization levels of non-quantized coefficients subsequent to the respective coefficient, wherein the predicted quantization levels of the non-quantized coefficients subsequent to the respective coefficient are based at least in part on coefficient values of the coefficients subsequent to the respective coefficient; and
select one of the plurality of the candidate quantization levels for each respective coefficient of the portion of the coefficients based on the coding costs for the plurality of candidate quantization levels associated with the respective coefficient, thereby obtaining a set of quantized coefficients.

22. The non-transitory computer-readable medium of claim 21,
wherein instructions that cause the device to determine the coding costs comprise instructions that cause the device to compute a plurality of coding costs for each of the candidate quantization levels associated with the respective coefficient based on surviving paths associated with a previous coefficient, the respective candidate quantization level associated with the respective coefficient, and the predicted quantization levels of the non-quantized coefficients subsequent to the respective coefficient, wherein the surviving paths represent sequences of quantization decisions for coefficients preceding the respective coefficient in the video block; and
wherein instructions that cause the device to select the one of the plurality of candidate quantization levels for each respective coefficient of the portion of the coefficients comprise instructions that cause the device to select a surviving path for each of the candidate quantization levels associated with the respective coefficient corresponding to a lowest coding cost of the plurality of coding costs for each of the candidate quantization levels associated with the respective coefficient.

23. The non-transitory computer-readable medium of claim 22, further comprising instructions that cause the device to select, for a last coefficient of the video block, a surviving path with a lowest coding cost from a plurality of surviving paths of candidate quantization levels associated with the last coefficient.

24. The non-transitory computer-readable medium of claim 21, further comprising instructions that cause the device to calculate at least one of the plurality of candidate quantization levels of the respective coefficient based on an absolute value of the respective coefficient, a quantization parameter, and a quantization matrix.

25. The non-transitory computer-readable medium of claim 24, wherein the plurality of candidate quantization levels include quantization level zero.

26. The non-transitory computer-readable medium of claim 25, further comprising instructions that cause the device to skip determination of coding costs for a plurality of candidate quantization levels associated with a particular coefficient of the video block if a quantized version of the particular coefficient is closer to the quantization level zero than quantization level one.

27. The non-transitory computer-readable medium of claim 21, further comprising instructions that cause the device to:
perform context adaptive variable length coding (CAVLC) on the set of quantized coefficients to entropy encode the set of quantized coefficients into a bitstream; and
output the encoded bitstream.

28. The non-transitory computer-readable medium of claim 21, wherein the predicted quantization levels of the non-quantized coefficients subsequent to the respective coefficient are based at least in part on an estimated maximum quantization level.

29. The non-transitory computer-readable medium of claim 21, wherein the predicted quantization levels of the non-quantized coefficients subsequent to the respective coefficient are based at least in part on coefficient statistics.

30. A device for quantizing at least a portion of coefficients of a video block in a video coding process, the device comprising:
means for determining, for each respective coefficient of the portion of the coefficients of the video block, coding costs for a plurality of candidate quantization levels associated with the respective coefficient, wherein the coding costs for the candidate quantization levels associated with the respective coefficient are based at least in part on predicted quantization levels of non-quantized coefficients subsequent to the respective coefficient, wherein the predicted quantization levels of the non-quantized coefficients subsequent to the respective coefficient are based at least in part on coefficient values of the coefficients subsequent to the respective coefficient; and
means for selecting one of the plurality of the candidate quantization levels for each respective coefficient of the portion of the coefficients based on the coding costs for the plurality of candidate quantization levels associated with the respective coefficient, thereby obtaining a set of quantized coefficients.

31. The device of claim 30,
wherein the determining means computes a plurality of coding costs for each of the candidate quantization levels associated with the respective coefficient based on surviving paths associated with a previous coefficient, the respective candidate quantization level associated with the respective coefficient, and the predicted quantization levels of the non-quantized coefficients subsequent to the respective coefficient, wherein the surviving paths represent sequences of quantization decisions for coefficients preceding the respective coefficient in the video block; and
wherein the selecting means selects a surviving path for each of the candidate quantization levels associated with the respective coefficient corresponding to a lowest coding cost of the plurality of the coding costs for each of the candidate quantization levels associated with the respective coefficient.

32. The device of claim 31, wherein the selecting means selects, for a last coefficient of the video block, a surviving path with a lowest coding cost from a plurality of surviving paths of candidate quantization levels associated with the last coefficient.

33. The device of claim 30, further comprising means for calculating at least one of the plurality of candidate quantization levels of the respective coefficient based on an absolute value of the respective coefficient, a quantization parameter, and a quantization matrix.

34. The device of claim 33, wherein the plurality of candidate quantization levels include quantization level zero.

35. The device of claim 34, further comprising means for skipping determination of coding costs for a plurality of candidate quantization levels associated with a particular coefficient of the video block if a quantized version of the particular coefficient is closer to the quantization level zero than quantization level one.

36. The device of claim 30, further comprising:
means for performing context adaptive variable length coding (CAVLC) on the set of quantized coefficients to entropy encode the set of quantized coefficients into a bitstream; and
means for outputting the encoded bitstream.

37. The device of claim 30, wherein the predicted quantization levels of the non-quantized coefficients subsequent to the respective coefficient are based at least in part on an estimated maximum quantization level.

38. The device of claim 30, wherein the predicted quantization levels of the non-quantized coefficients subsequent to the respective coefficient are based at least in part on coefficient statistics.

* * * * *